3,498,990
7α-CYANOINDOLOMORPHANS
John Shavel, Jr., Mendham, and Glenn C. Morrison, Dover, N.J., assignors to Warner-Lambert Pharmaceutical Company, Morris Plains, N.J., a corporation of Delaware
No Drawing. Filed Aug. 25, 1967, Ser. No. 663,233
Int. Cl. C07d *52/00, 33/06*
U.S. Cl. 260—293                           3 Claims

ABSTRACT OF THE DISCLOSURE

This invention describes a new class of cyanoindolomorphans of the formula:

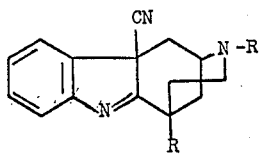

wherein R is lower alkyl. These compounds are useful as hypotensive agents.

---

The present invention relates to new and useful heterocyclic compounds and more particularly, this invention relates to new and novel 7α-cyanoindolomorphans having the formula:

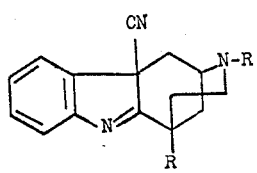

wherein R is lower alkyl from 1 to 6 carbon atoms, such as methyl, ethyl, butyl, isobutyl, propyl, isopropyl, hexyl and the like.

Also embraced within the scope of this invention are the pharmaceutically acceptable acid addition salts of the above compounds, as well as their quaternary ammonium salts and N-oxides.

The invention also includes within its scope a novel process for the production of these compounds.

The symbol R used hereinafter has the same meaning as defined.

The compounds of this invention are hypotensive agents. They are useful in the treatment of mild hypertension in mammals. A dose of about 25 to 100 mg., administered orally or intramascularly several times daily to a mammal having a body weight of about 70 kg. produces the desired hypotensive effects. This dosage regimen may be adjusted according to individual variations in body weight.

In order to use these compounds, they are combined with an inert pharmaceutical carrier such as water, lactose, starch, and compounded to dosage forms such as solutions, injections, tablets, capsules and the like.

The compounds of this invention may also be combined with other known therapeutic agents, for example, tranquilizers, analgesics, sedatives and the like to enhance and broaden their therapeutic spectrum.

Accordingly, to the present invention, the above compounds are prepared by reacting indolomorphans (A) with cyanogen bromide. This reaction gives chiefly the desired 7α-cyanoindolomorphans (B) of this invention and the 2-cyanoindolomorphans (C). This reaction is carried out in a halogenated hydrocarbon solvent such as chloroform, employing a temperature range of about 20° C. to 60° C.

The foregoing reaction may be illustrated by the following scheme:

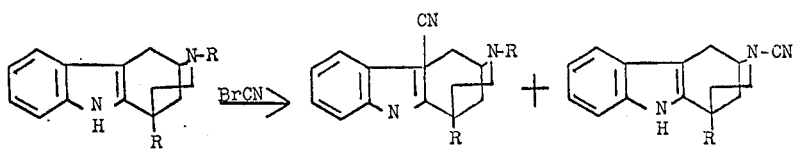

The compounds of our invention may be converted into their pharmaceutically acceptable non-toxic acid addition and quaternary ammonium salts by conventional procedures. Exemplary of non-toxic acid addition salts are those formed with acetic, maleic, fumaric, succinic, tartaric, citric, malic, cinnamic, sulfonic, hydrochloric, hydrobromic, sulfuric, phosphoric and nitric acids. The acid addition salts may be prepared in the conventional manner by treating a solution or suspension of the free base in an organic solvent with the desired acid, and then recovering the salts which form by crystallization techniques. The quaternary salts are prepared by heating a suspension of the free base in a solvent with a reactive halide such as methyl iodide, ethyl bromide, n-hexyl bromide, benzyl chloride or a reactive ester such as methyl sulfate, ethyl sulfate or methyl p-toluene sulfonate. The N-oxides of the above compounds are prepared by treating the free base with a suitable oxidizing agent, such as hydrogen peroxide.

The starting indolomorphans (A) are described and prepared in accordance with the teachings set forth in our patent, U.S. 3,264,310, issued Aug. 2, 1966.

The following example is included in order further to illustrate the invention.

EXAMPLE

Reaction of a 2,5-dimethylindolo[2,3-f]morphan with cyanogen bromide

A solution of 2.0 g. of 2,5-dimethylindolo[2,3-f]morphan and 1.4 g. of cyanogen bromide in 25 ml. of chloroform is refluxed for 3 hr. The solvent is removed and the residue is chromatographed on 80 g. of alumina. The column is washed with a solution of benzene-methylene chloride (10:1). On concentration of the eluent, there is deposited 0.15 g. (7%) of 2-cyano-5-methylindolo-[2,3-f]morphan, M.P. 271–272° C.

*Analysis.*—Calcd. for $C_{16}H_{17}N_3$: C, 76.46; H, 6.82; N, 16.72%. Found: C, 76.60; H, 6.96; N, 16.85%.

Removal of the solvent from the mother liquor gives 0.86 g. (39%) of 7α-cyano-2,5-dimethylindolo[2,3-f]morphan, M.P. 127–128° C. Recrystallization from Skelly-solve B gives an analytical sample, M.P. 132–133° C.

*Analysis.*—Calcd. for $C_{17}H_{19}N_3$: C, 76.95; H, 7.21; N, 15.84%. Found: C, 76.91; H, 7.25; N, 16.07%.

It is understood that the foregoing detailed description is given merely by way of illustration and that many variations may be made therein without departing from the spirit of our invention.

Having described our invention, what we desire to secure by Letters Patent is:

1. A member selected from the group consisting of the free base of the formula:

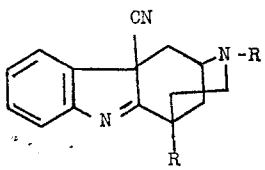

wherein R is lower alkyl and its pharmaceutically acceptable acid addition salts; its quaternary ammonium salts; and its N-oxides.

2. The compound of claim 1 which is 7α-cyano-2,5-dimethylindolo[2,3-f]morphan and its pharmaceutically acceptable acid addition salts; its quaternary ammonium salts; and its N-oxides.

3. Process for the production of the free base of claim 1 which comprises contacting a compound of the formula:

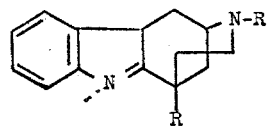

wherein R is lower alkyl with cyanogen bromide in a halogenated hydrocarbon solvent at a temperature of 20 to 60° C.

References Cited

UNITED STATES PATENTS 3,264,310   8/1966   Shavel et al. _____ 260—293

HENRY R. JILES, Primary Examiner

G. THOMAS TODD, Assistant Examiner

U.S. Cl. X.R.

260—293.4, 294, 999